(12) United States Patent
Ono et al.

(10) Patent No.: US 11,975,663 B2
(45) Date of Patent: May 7, 2024

(54) WIRE HARNESS ROUTING APPARATUS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Masami Ono, Mie (JP); Satoshi Yamamoto, Mie (JP); Hirotaka Kato, Mie (JP); Nahoko Furuhata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 307 days.

(21) Appl. No.: 17/621,568

(22) PCT Filed: Jun. 25, 2020

(86) PCT No.: PCT/JP2020/024999
§ 371 (c)(1),
(2) Date: Dec. 21, 2021

(87) PCT Pub. No.: WO2021/006053
PCT Pub. Date: Jan. 14, 2021

(65) Prior Publication Data
US 2022/0355749 A1 Nov. 10, 2022

(30) Foreign Application Priority Data
Jul. 8, 2019 (JP) .................................. 2019-126701

(51) Int. Cl.
*B60R 16/02* (2006.01)
*H02G 11/02* (2006.01)

(52) U.S. Cl.
CPC ......... *B60R 16/0215* (2013.01); *H02G 11/02* (2013.01)

(58) Field of Classification Search
CPC .... B60R 16/0215; H02G 11/00; H02G 11/02; H02G 3/0437; H02G 3/30; H02G 3/32; H01B 7/0838; H01B 7/08
See application file for complete search history.

(56) References Cited

U.S. PATENT DOCUMENTS

| | | | |
|---|---|---|---|
| 6,267,430 B1 | 7/2001 | Cresseaux | |
| 2013/0240243 A1* | 9/2013 | Gundel | H01B 11/203 174/117 F |

(Continued)

FOREIGN PATENT DOCUMENTS

| | | |
|---|---|---|
| DE | 4102383 A1 | 8/1991 |
| DE | 69019595 T2 | 9/1995 |

(Continued)

OTHER PUBLICATIONS

International Search Report dated Aug. 25, 2020 for WO 2021/006053 A1 (4 pages).

*Primary Examiner* — Paresh Paghadal
(74) *Attorney, Agent, or Firm* — Venjuris, P.C.

(57) ABSTRACT

A wire harness routing apparatus includes a case and a wire harness accommodated in the case. An axial portion is provided inside the case, and the wire harness is wound around the axial portion, and the wire harness includes at least one wire and a protective member that protects the wire. The protective member includes an insertion path through which the wire is inserted, and the insertion path is formed between a sheet-shaped base sheet and a sheet-shaped cover sheet that overlaps the base sheet, and the (Continued)

protective member includes joining portions where the base sheet and the cover sheet are joined together at both lateral edges of the insertion path.

4 Claims, 9 Drawing Sheets

(56) References Cited

U.S. PATENT DOCUMENTS

2013/0341063 A1* 12/2013 Gundel .................. H01B 11/18
  174/103
2021/0213858 A1* 7/2021 Yamamoto ............. B60N 2/753

FOREIGN PATENT DOCUMENTS

| DE | 19535355 A1 | 3/1996 |
| JP | S60-109212 U | 7/1985 |
| JP | H01-119114 U | 8/1989 |
| JP | 2012-105446 A | 5/2012 |

* cited by examiner

WIRE HARNESS ROUTING APPARATUS

CROSS REFERENCE TO RELATED APPLICATIONS

This application is a national phase of PCT application No. PCT/JP2020/024999, filed on 25 Jun. 2020, which claims priority from Japanese patent application No. 2019-126701, filed on 8 Jul. 2019, all of which are incorporated herein by reference.

TECHNICAL FIELD

The present disclosure relates to a wire harness routing apparatus.

BACKGROUND

A wire harness routing apparatus disclosed in Japanese Patent Laid-Open Publication No. 2012-105446 is known conventionally. This wire harness routing apparatus is used in a sliding seat of an automobile, for example. The wire harness routing apparatus includes a harness, a protector that is slidably attached to a rail, holds the harness pulled in the rail from an opening portion, and extends out from a slit, a folded portion provided with a guide groove for folding back the harness pulled to the outside of the rail from the opening portion into a U-shape, and an accommodation portion for accommodating an excess length portion of the folded harness. The harness is constituted by a plurality of wires and a corrugated tube in which these wires are accommodated.

PRIOR ART DOCUMENT

Patent Document

Patent Document 1: JP 2012-105446 A

SUMMARY OF THE INVENTION

Problems to be Solved

According to the above-described configuration, when the protector moves along the rail, the excess length portion of the harness pulled out from the opening portion of the protector is accommodated in the accommodation portion in a bent state.

According to the above-described configuration, because the harness is accommodated in the corrugated tube, if the movement amount of the sliding seat is large, the excess length portion of the harness also increases, and thus the length of the corrugated tube also increases. In such a case, there is the problem that the space for accommodating the bent corrugated tube also increases.

This disclosure has been accomplished based on the above-described circumstances, and aims to provide a small wire harness routing apparatus.

Means to Solve the Problem

What is disclosed here is a wire harness routing apparatus including a case and a wire harness that is accommodated in the case. An axial portion is provided inside the case, and the wire harness is wound around the axial portion, and the wire harness includes at least one wire and a protective member that protects the wire. The protective member includes an insertion path through which the wire is inserted, and the insertion path is formed between a sheet-shaped base sheet and a sheet-shaped cover sheet that overlaps the base sheet. The protective member includes joining portions where the base sheet and the cover sheet are joined together at both lateral edges of the insertion path.

Effect of the Invention

According to this disclosure, the size of the wire harness routing apparatus can be reduced.

DETAILED DESCRIPTION TO EXECUTE THE INVENTION

Figure 1:
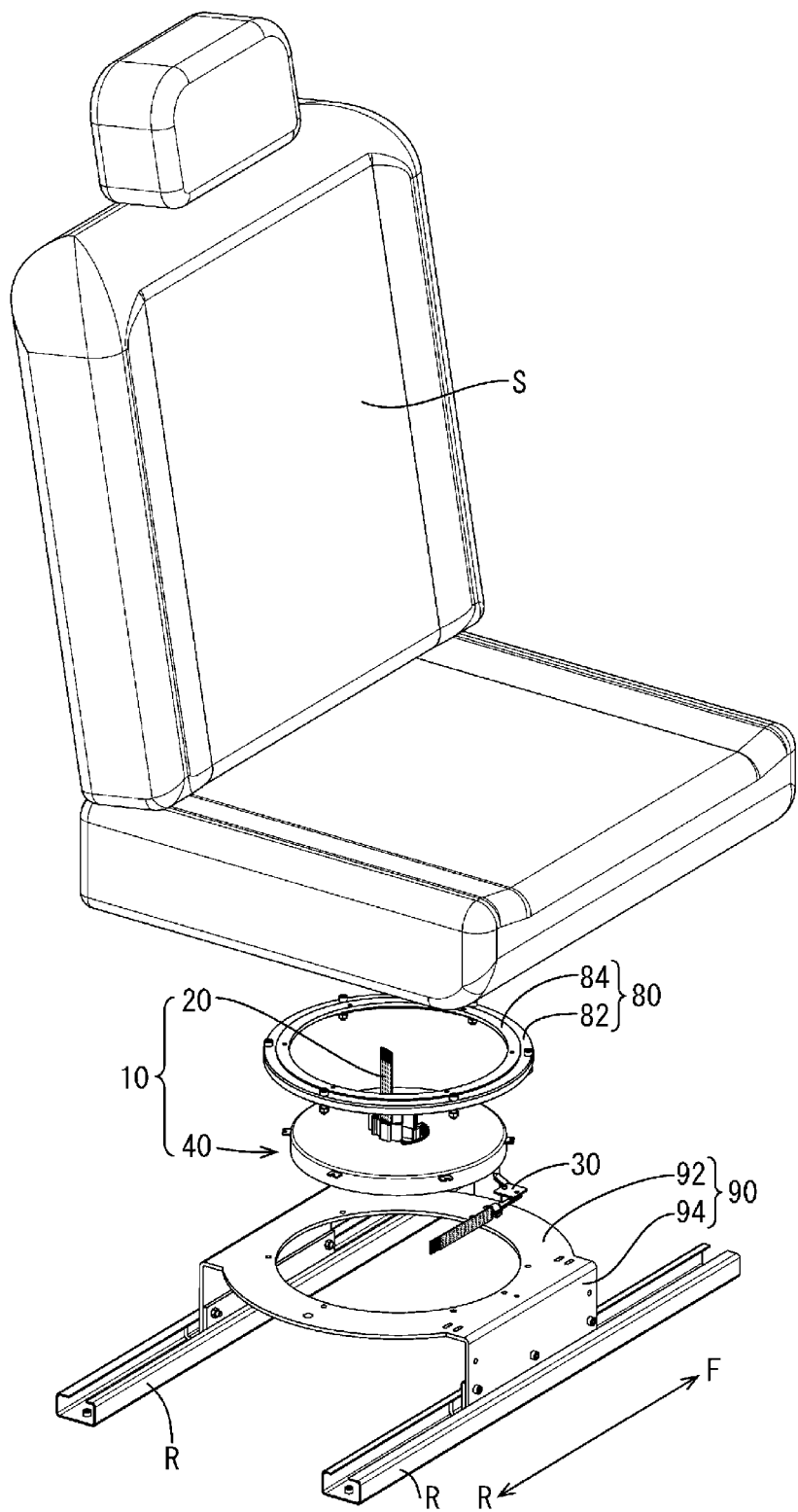
FIG. 1 is an exploded perspective view showing a state prior to attaching a wire harness routing apparatus according to Embodiment 1, a seat, a rotation platform, and a base portion.

Description of Embodiments of the Present Disclosure

First, embodiments of this disclosure will be listed and described.

(1) What is disclosed here is a wire harness routing apparatus including a case and a wire harness that is accommodated in the case. An axial portion is provided inside the case, and the wire harness is wound around the axial portion, and the wire harness includes at least one wire and a protective member that protects the wire. The protective member includes an insertion path through which the wire is inserted, and the insertion path is formed between a sheet-shaped base sheet and a sheet-shaped cover sheet that overlaps the base sheet. The protective member includes joining portions where the base sheet and the cover sheet are joined together at both lateral edges of the insertion path.

The protective member is formed as a result of the base sheet and the cover sheet overlapping each other, and thus can be thinner than a corrugated tube. As a result, it is possible to reduce the outer diameter of the wire harness wound around the axial portion, and thus to reduce the size of the case and the size of the wire harness routing apparatus.

Because the wire is inserted through the tubular insertion path, the wire can easily move inside the insertion path in a direction in which the insertion path extends. As a result, the wire harness can be easily wound around the axial portion, and thus it is possible to reduce the size of the case and further reduce the size of the wire harness routing apparatus.

(2) It is preferable that one of the wires is inserted through one of the insertion paths.

Because one wire is inserted through one insertion path, the wire can easily move inside the insertion path. As a result, the wire harness is easily bent, and thus it is possible to reduce the outer diameter of the wire harness wound around the axial portion, and thus to further reduce the size of the wire harness routing apparatus.

(3) It is preferable that the base sheet and the cover sheet are woven fabrics or nonwoven fabrics.

Because woven fabric or nonwoven fabric internally has a large number of holes, it is possible to reduce the weight of the wire harness, compared to a wire harness in which the base sheet and the cover sheet are constituted by solid members. This makes it possible to reduce the weight of the wire harness routing apparatus.

(4) It is preferable that the protective member includes a sewing thread with which the base sheet and the cover sheet are sewn at the joining portions.

Because a sewing machine can be used when the base sheet and the cover sheet are joined together, it is possible to improve the efficiency of manufacturing the wire harness routing apparatus.

Details of Embodiments of the Present Disclosure

The following describes embodiments of this disclosure. The present invention is not limited to these examples, but is indicated by the claims, and all changes that come within the meaning and range of equivalency of the claims are intended to be embraced therein.

First Embodiment

Embodiment 1 of this disclosure will be described with reference to FIGS. 1 to 8. As shown in FIG. 1, this embodiment illustrates a wire harness routing apparatus 10 having a wire harness 20 that is routed between a seat S and a base portion 90 provided in a vehicle (not shown) such as an automobile. Note that in the following description, the front-rear direction is described with reference to the directions of the arrows in the drawings, the F side being the front side, and the R side being the rear side.

Seat S

The seat S is, for example, a seat used as a driver's seat of a vehicle, and as shown in FIG. 1, is fixed to the base portion 90 that can slide in a front-rear direction on a pair of metal rails R that are fixed to a floor portion of the vehicle.

Base Portion 90

As shown in FIG. 1, the base portion 90 includes a base main body 92 that has an approximately circular frame shape and a pair of leg portions 94 that protrude slightly in the left-right direction from both end portions of the base main body 92 and extend downward. The pair of leg portions 94 are attached to the pair of rails R and are able to slide in the front-rear direction, and the rotation platform 80 is fixed to the upper surface of the base main body 92.

Rotation Platform 80

The rotation platform 80 is made of metal and includes a base-side pedestal 82 that is fixed to the base main body 92 and a seat-side pedestal 84 that is supported rotatably on the base-side pedestal 82. The base-side pedestal 82 is formed into a flat ring shape and is fixed to the base main body 92 through bolt fastening or the like.

The seat-side pedestal 84 has a flat ring shape that is one size smaller than the base-side pedestal 82, and is fixed to the bottom portion of the seat S through bolt fastening or the like. Also, the seat-side pedestal 84 is attached to the inner side of the base-side pedestal 82 via bearings, and can rotate with respect to the base-side pedestal 82 about the axial center of the base-side pedestal 82. Accordingly, the seat S can rotate with respect to the base portion 90.

In this embodiment, the base-side pedestal 82 and the seat-side pedestal 84 can rotate with respect to each other using the bearings. However, the base-side pedestal and the seat-side pedestal may also rotate with respect to each other through any known method, such as providing an arc-shaped rail groove on the base-side pedestal and providing a slider that can slide in the rail groove on the seat-side pedestal.

Also, a stopper (not shown) is provided between the base-side pedestal 82 and the seat-side pedestal 84, and due to this stopper, the base-side pedestal 82 and the seat-side pedestal 84 cannot rotate more than one full turn.

Wire Harness Routing Apparatus 10

Figure 2:
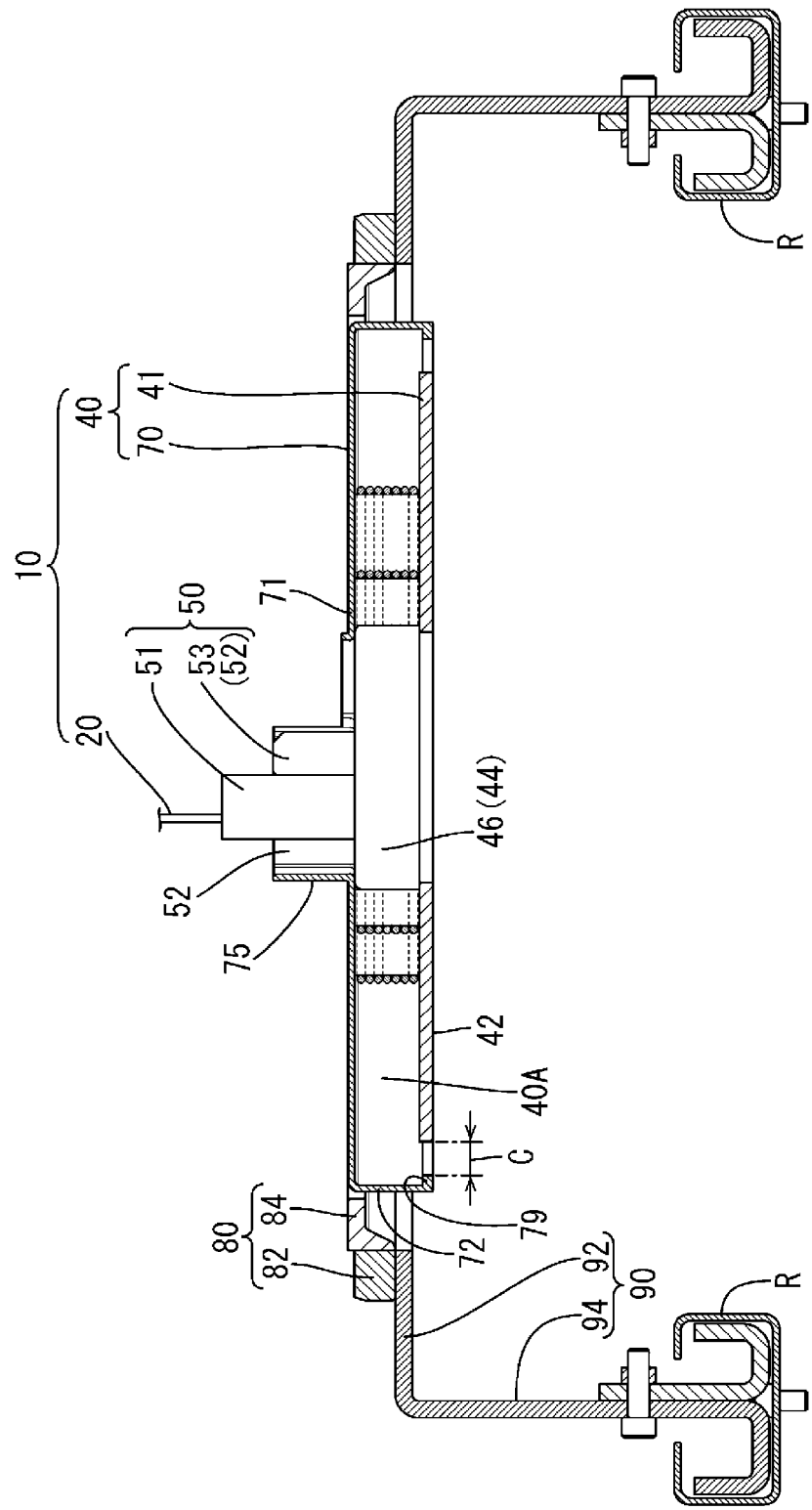
FIG. 2 is a cross-sectional view showing a state where the wire harness routing apparatus is attached to the rotation platform.

As shown in FIG. 2, the wire harness routing apparatus 10 includes a wire harness 20 and a case 40 accommodating the wire harness 20. One end of the wire harness 20 is fixed to the base portion 90 by a base-side fixing member 30.

Wire Harness 20

One end portion of the wire harness 20 is a base-side end portion 20A routed toward the base portion 90, and is connected to a device (not shown) such as an ECU (Electronic Control Unit) of the vehicle. The wire harness 20 routed toward the base portion 90 of this embodiment is routed, for example, on the floor or under the floor below a mat or a panel from the base portion 90, but this is not shown in the drawings.

On the other hand, the other end portion of the wire harness 20 is a seat-side end portion 20B, and for example, is connected to any electrical component (not shown) on the seat side, such as an electric slide, an electric reclining motor, or a seat heater, which are attached to the seat S. Also, the supply of power and transmission and reception of signals between the devices on the vehicle side and the electrical components of the seat S are performed by the wire harness 20.

Figure 3:
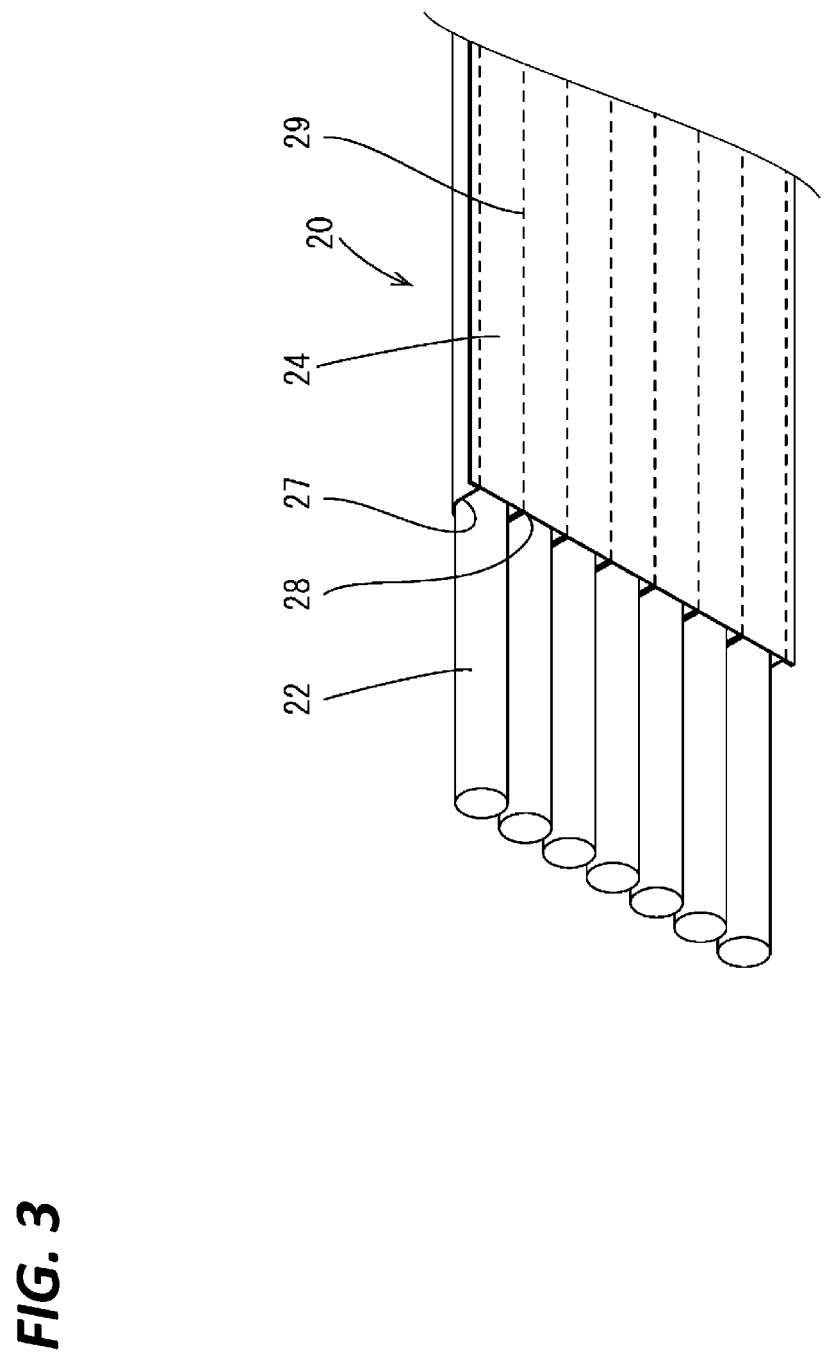
FIG. 3 is a perspective view showing a wire harness.

Also, as shown in FIG. 3, the wire harness 20 includes multiple (in this embodiment, seven) wires 22 and a protective member 24 through which the wires 22 are inserted. The wires 22 are each obtained by covering a core wire composed of metal with excellent conductivity with an insulating sheath made of synthetic resin, and the end portion on the seat side of each wire 22 is arranged in the seat S and connected to an electrical component.

Protective Member 24

Figure 4:
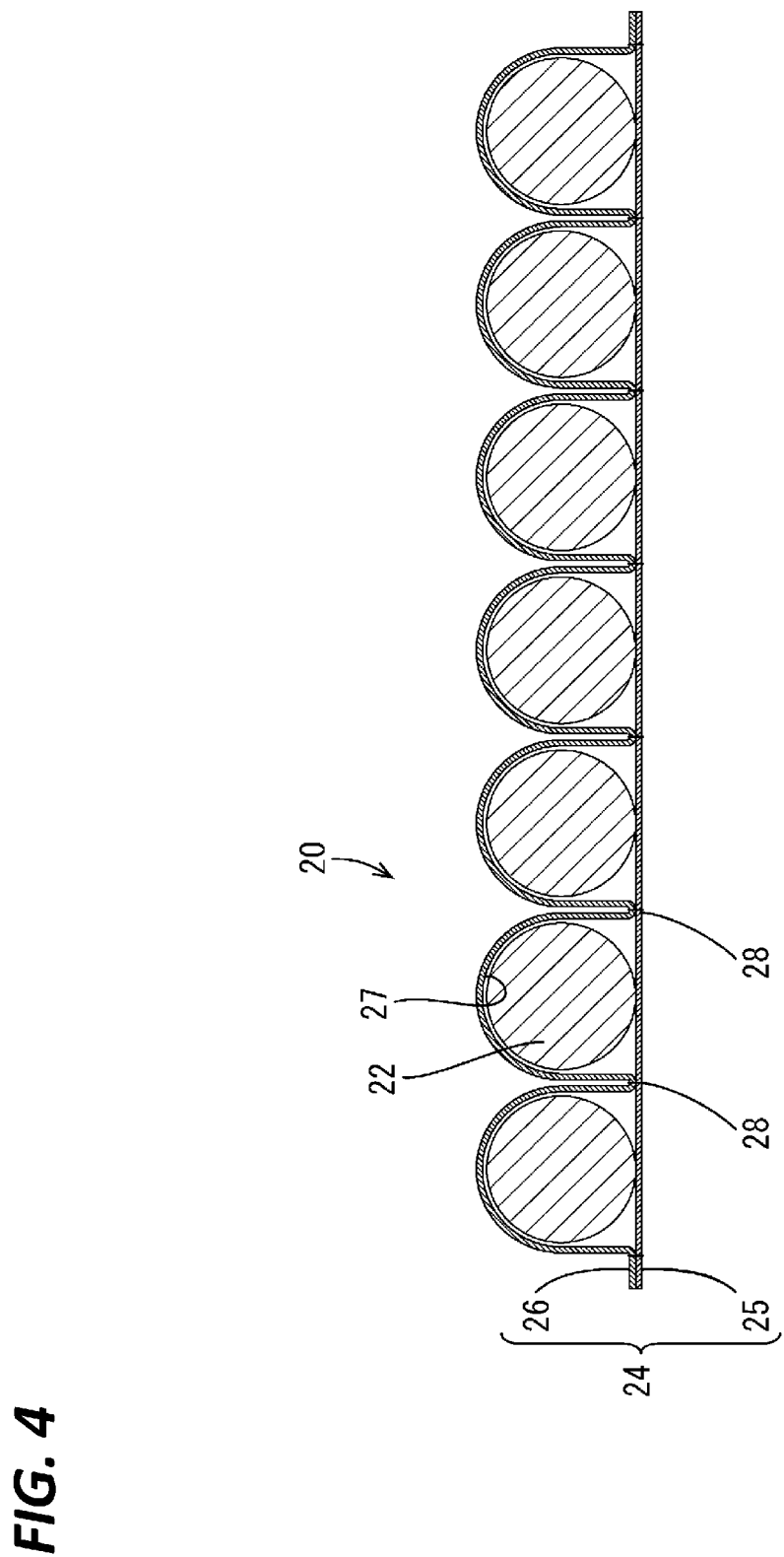
FIG. 4 is a cross-sectional view taken along line IV-IV in FIG. 5.
Figure 5:
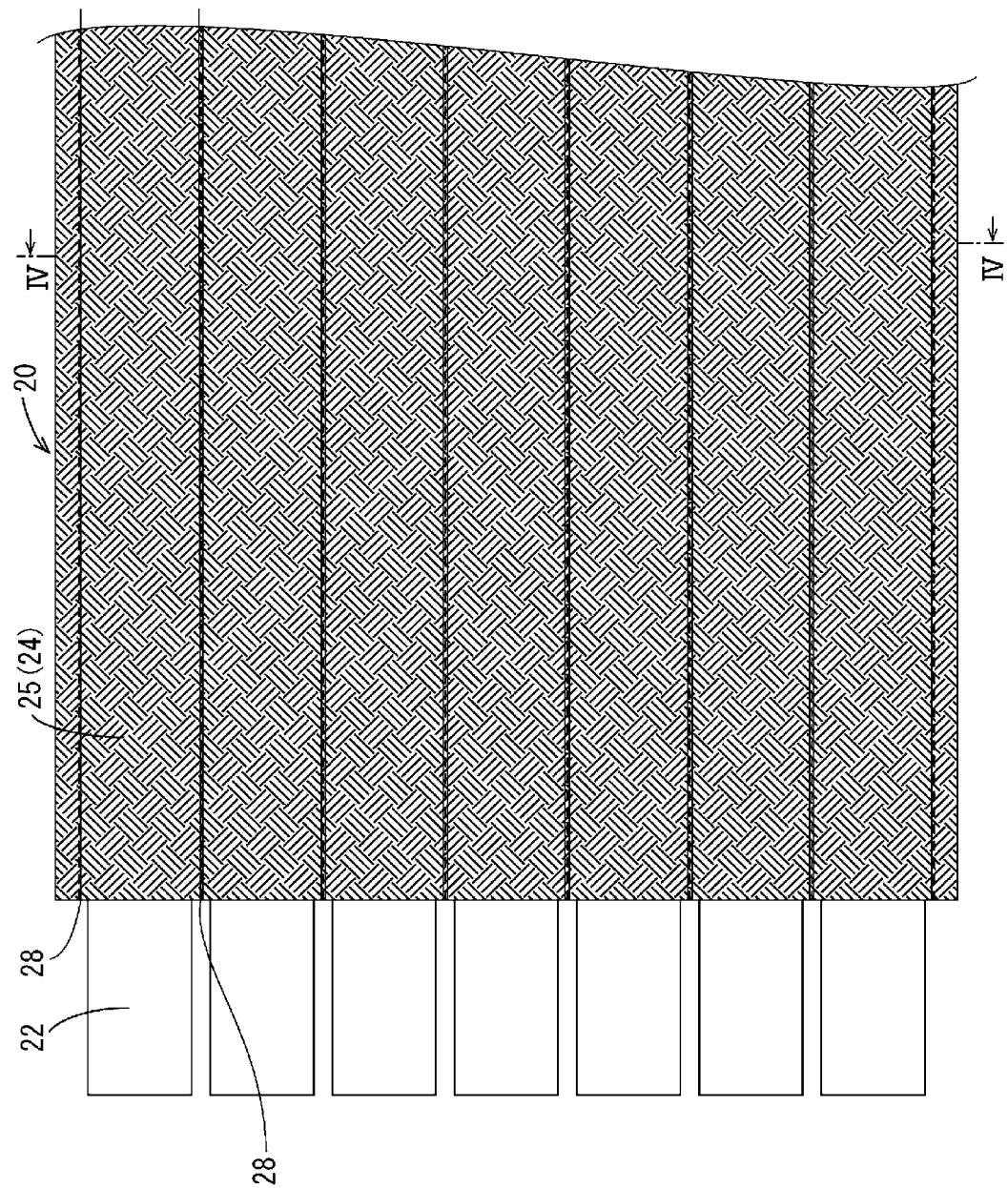
FIG. 5 is a plan view showing the wire harness.
Figure 6:
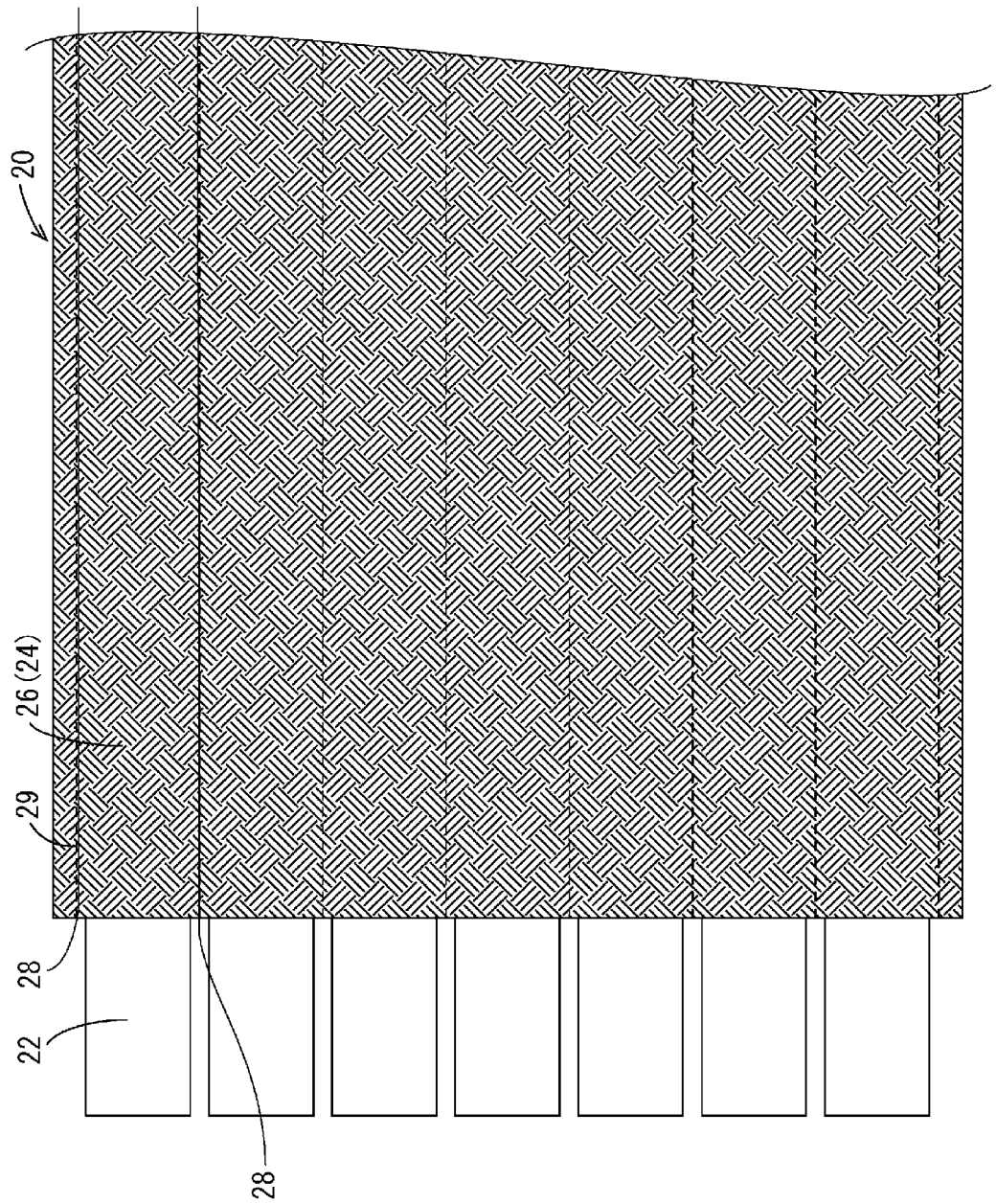
FIG. 6 is a bottom view showing the wire harness.

As shown in FIG. 4, the protective member 24 is formed in a sheet shape. In this embodiment, the protective member 24 has an elongated rectangular shape. The protective member 24 includes a base sheet 25 and a cover sheet 26 overlapping the base sheet 25. The base sheet 25 and the cover sheet 26 have a sheet shape.

The base sheet 25 and the cover sheet 26 may be solid sheets, nonwoven fabrics, or woven fabrics. Both the base sheet 25 and the cover sheet 26 may be solid (i.e. non-porous) sheets. Also, one of the base sheet 25 and the cover sheet 26 may be a solid sheet, and the other may be a woven or nonwoven fabric. In this embodiment, both the base sheet 25 and the cover sheet 26 are nonwoven fabrics.

There is no particular limitation regarding the materials constituting the base sheet 25 and the cover sheet 26, and they may be selected as appropriate from any synthetic resins such as VC (polyvinyl chloride), PE (polyethylene), PP (polypropylene), PBT (polybutyleneterephtalate), and PET (polyethyleneterephtalate), for example.

If the base sheet 25 is a nonwoven fabric, the base sheet 25 may be a fiber sheet, a web (a film-shaped thin sheet composed of only fibers), or a batt (of blanket-like fibers).

If the base sheet 25 and the cover sheet 26 are woven fabrics, synthetic fibers composed of the above-described synthetic resin may also be used, or natural fibers such as cotton, linen, or silk fibers may be used, or both synthetic fibers and natural fibers may also be used.

If the base sheet 25 and the cover sheet 26 are woven fabrics, the base sheet 25 and the cover sheet 26 may be in a so-called bias-cut state where they are cut such that the direction in which the warp extends and the direction in which the weft extends extend in a direction intersecting the longitudinal direction of the base sheet 25 and the cover sheet 26. Accordingly, the base sheet 25 and the cover sheet 26 are likely to stretch and contract in the longitudinal direction, and thus it is possible to inhibit a force from being applied to the wire inserted through the protective member 24 in a state where the protective member 24 is bent. As a result, the wire inserted in the later-described insertion path 27 can more easily move. As a result, the wire harness 20 is easily bent, and thus it is possible to reduce the outer diameter of the wire harness 20 wound around the seat-side fixing portion 44 (an example of the axial portion) and thus to further reduce the size of the wire harness routing apparatus.

As shown in FIG. 4, the protective member 24 includes a plurality (in this embodiment, seven) insertion paths 27. Each insertion path 27 is formed in a tubular shape extending in the longitudinal direction of the base sheet 25 and the cover sheet 26 between the base sheet 25 and the cover sheet 26 in a state where the insertion path 27 overlaps with the base sheet 25 and the cover sheet 26. Both lateral edges of the insertion path 27 are provided with joining portions 28 where the base sheet 25 and the cover sheet 26 are joined together (see FIG. 5).

There is no particular limitation regarding the intervals between adjacent insertion paths 27, which may be equal to each other or different from each other. Furthermore, multiple insertion paths 27 may also be arranged side-by-side at narrow intervals, or may also be arranged at widely separate intervals.

There is no particular limitation regarding the means for joining the base sheet 25 and the cover sheet 26 together at the joining portions 28. The base sheet 25 and the cover sheet 26 may be sewn with a sewing thread, or may also be bonded with an adhesive, for example. If the base sheet 25 and the cover sheet 26 are made of synthetic resins, they may be heat-sealed. Furthermore, the base sheet 25 and the cover sheet 26 may be joined by riveting, eyelets, or the like. In one protective member 24, the base sheet 25 and the cover sheet 26 may be joined using a plurality of methods. In this embodiment, the base sheet 25 and the cover sheet may also be sewn with a sewing thread 29 (see FIGS. 3 and 6).

Synthetic fibers such as polyimide or polyamide fibers or natural fibers such as cotton, linen, or silk fibers may be used as the material constituting the sewing thread 29. The sewing thread 29 made of synthetic fibers is used in this embodiment.

The insertion path 27 is formed by joining the base sheet 25 and the cover sheet 26 together at the joining portions 28 in a state where one or both of the base sheet 25 and the cover sheet 26 are curved in a groove shape extending in the longitudinal direction. The insertion path 27 is formed by curving the cover sheet 26 in this embodiment.

One wire is inserted through one insertion path 27. The inner shape of the insertion path 27 is the same as or slightly larger than the outer shape of the wire. The wire 22 is inserted through the insertion path 27 movably in the longitudinal direction of the protective member 24.

As described above, the wire 22 is inserted movably in the longitudinal direction of the protective member 24 in the insertion path 27. Therefore, even if the protective member 24 is bent in a direction intersecting the surface of the base sheet 25, the movement of the wire 22 makes it possible to reduce a force applied from the protective member 24 to the wire 22. Accordingly, the protective member 24 is easily bent in the direction intersecting the surface of the base sheet 25.

Base-side Fixing Member 30

The base-side fixing member 30 is made of a synthetic resin, and as shown in FIG. 1, is fixed to the base portion 90 in a state in which it holds the base-side end portion 20A of the wire harness 20, and includes an outer covering body holding portion 31 that holds the end portion on the base portion 90 side of the protective member 24, a guide tube portion 32 that guides the multiple wires 22 pulled out from the protective member 24, a protective member holding portion 33 that holds the protective member 24 through which the multiple wires 22 pulled out from the guide tube portion 32 are inserted, and a fixing piece 34 that fixes the guide tube portion 32 to the base portion 90.

The outer covering body holding portion 31 holds and fixes an end portion of the protective member 24 of the wire harness 20 from outside.

Figure 7:
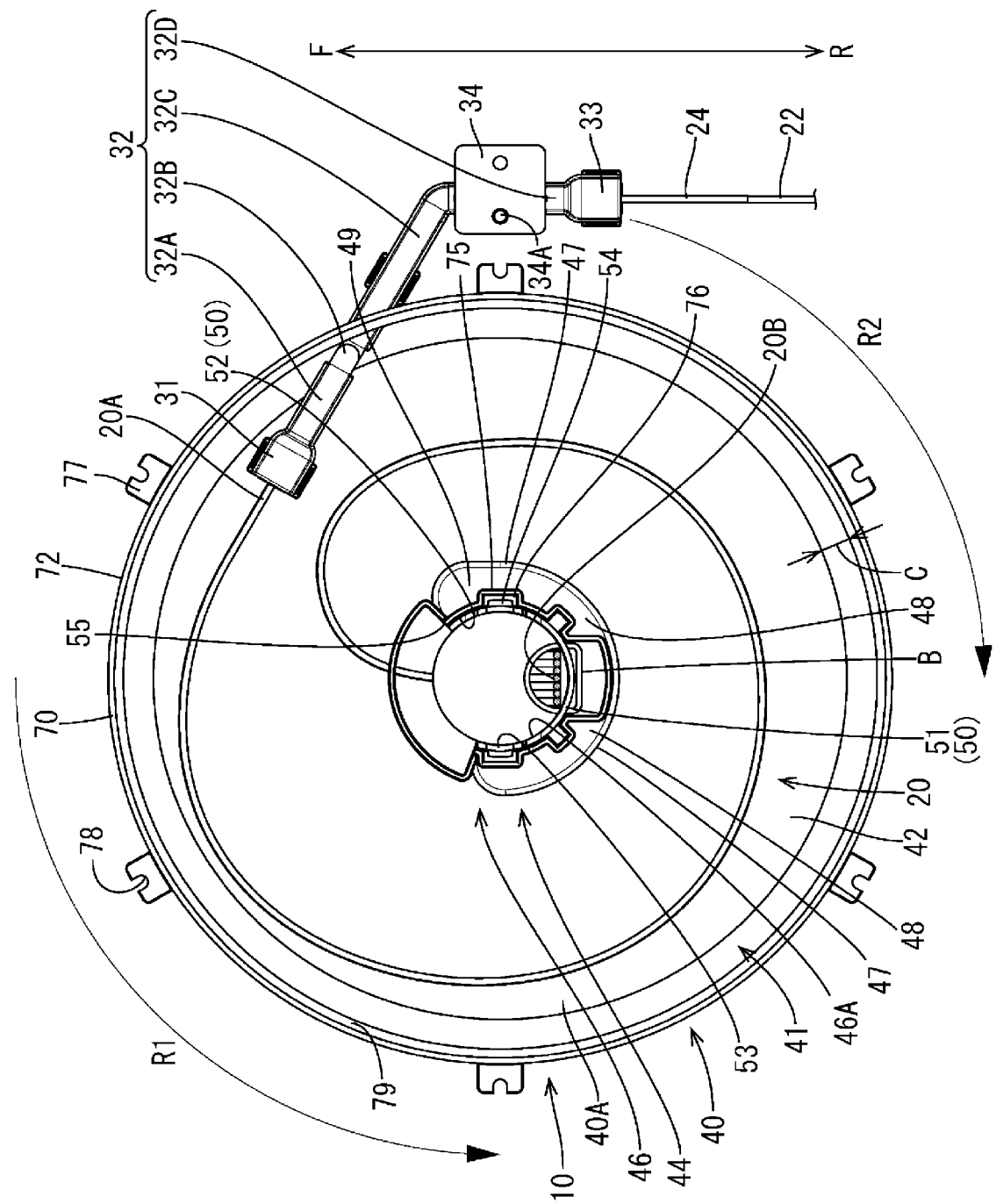
FIG. 7 is a plan view showing a state where the wire harness surrounds a seat-side fixing portion approximately once.

As shown in FIG. 7, the guide tube portion 32 is continuous with the outer covering body holding portion 31 and is formed into a circular tube shape, and the multiple wires 22 pulled out from the protective member 24 can be inserted through the inner portion of the guide tube portion 32. The guide tube portion 32 includes a first tube-shaped portion 32A that extends straight in the same direction as the extension direction of the outer covering body holding portion 31 from the end portion of the outer covering body holding portion 31, a second tube-shaped portion 32B that extends downward from the leading end portion of the first tube-shaped portion 32A, a third tube-shaped portion 32C that further extends straight in the same direction as the extension direction of the outer covering body holding portion 31 from the lower end portion of the second tube-shaped portion 32B, and a fourth tube-shaped portion 32D that extends bent from the leading end portion of the third tube-shaped portion 32C. The fixing piece 34 is connected on the upper portion of the fourth tube-shaped portion 32D, and the protective member holding portion 33 is connected on the leading end of the fourth tube-shaped portion 32D.

The fixing piece 34 has a plate shape, and a circular tube portion 34A that can fit in the plate thickness direction in the base main body 92 of the base portion 90 is provided on the upper surface of the fixing piece 34. By fitting the circular tube portion 34A into the base main body 92 and the fixing piece 34 and the base main body 92 being fixed together through bolt fastening or the like, the base-side fixing member 30 is fixed to the base main body 92. That is, the base-side end portion 20A of the wire harness 20 is fixed to the base portion 90 via the base-side fixing member 30.

Case 40

The case 40 is made of a synthetic resin, and as shown in FIG. 7, is formed into a circular shape in plan view. The outer radius of the case 40 is set slightly smaller than the inner radius of the seat-side pedestal 84 of the rotation platform 80, and can be arranged on the inner side in the radial direction of the seat-side pedestal 84 of the rotation platform 80.

Also, as shown in FIG. 7, the case 40 includes an accommodation portion 40A in which the wire harness 20 is accommodated, and the height of the accommodation portion 40A is set slightly larger than the height of the rotation platform 80. That is, the accommodation portion 40A that accommodates the wire harness 20 in the case 40 is approximately accommodated at a position on the inner side in the radial direction of the rotation platform 80.

Multiple (in this embodiment, six) attachment pieces 77 that protrude outward are provided at equal intervals on the outer circumferential surface of the case 40. A screw recessed portion 78 with a recessed shape is provided on the protruding end portion of each attachment piece 77, and the case 40 is fixed to the seat-side pedestal 84 by inserting a screw through the screw recessed portion 78 and fastening the screw to the seat-side pedestal 84 of the rotation platform 80.

Accordingly, when the case 40 is fixed to the rotation platform 80, the case 40 is arranged along the inner circumferential surface of the seat-side pedestal 84, and as shown in FIG. 7, the case 40 rotates together with the rotation of the seat S about the rotation axis of the rotation platform 80 over a 360-degree range.

Also, as shown in FIG. 2, the case 40 includes a lower case portion 41 and an upper case portion 70 that is attached to the lower case portion 41 from above, and the accommodation portion 40A is formed by the lower case portion 41 and the upper case portion 70 by attaching the upper case portion 70 to the lower case portion 41 from above.

The lower case portion 41 includes a flat plate-shaped bottom plate portion 42 that has an outer shape that is circular in plan view, and a seat-side fixing portion 44 (an example of the axial portion) provided on the bottom plate portion 42.

The wire harness 20 that is pulled out from the outer covering body holding portion 31 of the base-side fixing member 30 can be placed on the bottom plate portion 42. Also, when the case 40 is fixed to the rotation platform 80 in a state in which the base-side fixing member 30 is fixed to the base portion 90, the outer covering body holding portion 31 of the base-side fixing member 30 holding the base-side end portion 20A of the wire harness 20, and the first tube-shaped portion 32A of the guide tube portion 32 are arranged in a state in which they rise slightly upward from the bottom plate portion 42.

Also, the second tube-shaped portion 32B in the guide tube portion 32 of the base-side fixing member 30 extends downward relative to the bottom plate portion 42 at a position on the outer side with respect to the outer circumferential edge of the bottom plate portion 42, and when the case 40 rotates in accordance with the seat S, the second tube-shaped portion 32B rotates and moves relatively over a 360-degree range on the outer periphery of the bottom plate portion 42.

The seat-side fixing portion 44 includes a protruding portion 46 that protrudes upward from the bottom plate portion 42 and a upright wall 50 that is provided upright further upward from the upper surface of the protruding portion 46. The protruding portion 46 is formed in a form that is rounded at the center of the bottom plate portion 42 in a view from above, and a through hole 46A that penetrates through the protruding portion 46 in the up-down direction is provided at the center of the protruding portion 46.

The protruding portion 46 includes a protruding side wall 47 that is provided upright on the bottom plate portion 42, and a protruding upper wall 48 that extends in the horizontal direction from the upper end portion of the protruding side wall 47 toward the center of the bottom plate portion 42, the through hole 46A being provided in the form of a circular hole in the protruding upper wall 48.

The protruding upper wall 48 is formed in an approximate ring shape at a portion of the opening edge, extending along the opening edge of the through hole 46A, and the right-side end portion of the protruding upper wall 48 is an overhang portion 49 that hangs over toward the outer side in the radial direction.

The protruding side wall 47 has a form connecting the outer circumferential edge of the protruding upper wall 48 and the bottom plate portion 42 in the up-down direction, and is a curved surface that extends along the axial center of the bottom plate portion 42 at the central portion of the bottom plate portion 42. Accordingly, the protruding side wall 47 is not formed at the portion of the opening edge of the through hole 46A at which the protruding upper wall 48 is not provided.

Similarly to the protruding portion 46, the upright wall 50 is formed into an approximate ring shape at a portion of the opening edge, extending along the opening edge of the through hole 46A, and the portion at which the upright wall 50 is formed is a portion that is similar to the protruding portion 46 in the through hole 46A.

The upright wall 50 includes a high upright wall 51 with a high height in the up-down direction, and low upright walls 52 with a height lower than that of the high upright wall 51, and the low upright walls 52 are arranged on both sides of the high upright wall 51.

An elastic piece 53 that can elastically deform toward the inner side in the radial direction due to being provided with a slit that extends vertically is provided on each low upright wall 52, and a locking protrusion 54 that protrudes outward is provided on each elastic piece 53.

Similarly to the protruding side wall 47, the upright wall 50 is not formed at the portion that opposes the high upright wall 51 in the upright wall 50.

That is, the portion at which the upright wall 50 is not formed and the portion at which the protruding side wall 47 is not formed in the protruding portion 46 are positions that are arranged side-by-side in the up-down direction in the seat-side fixing portion 44, and the portions at which the upright wall 50 and the protruding side wall 47 are not present are harness insertion ports 55 through which the inner-side portion surrounded by the protruding side wall 47 and the upright wall 50 and the outer-side portions of the protruding side wall 47 and the upright wall 50 are in communication with each other.

The wire harness 20 placed on the bottom plate portion 42 is pulled in through the harness insertion port 55 at the central portion of the bottom plate portion 42 surrounded by the protruding side wall 47 and the upright wall 50. The wire harness 20 pulled in through the harness insertion port 55 is guided toward the upper side, which is the seat S side, by being bent upward, extending along the high upright wall 51.

A pair of band insertion holes (not shown) that penetrate in the wall thickness direction are provided on the high upright wall 51, and the seat-side end portion 20B of the wire harness 20 is fixed to the central portion of the bottom plate portion 42 by inserting a bundling band B through the pair of band insertion holes and bundling the protective member 24 of the wire harness 20 together with the high upright wall 51. In other words, in the seat-side fixing portion 44, the seat-side end portion 20B of the wire harness 20 is fixed near the rotational center of the case 40.

Also, as shown in FIG. 7, the wire harness 20 fixed to the seat-side fixing portion 44 is pulled out from the harness insertion port 55 onto the bottom plate portion 42, and thereafter is arranged so as to surround the seat-side fixing portion 44 at least once, and the base-side end portion 20A is held in the base-side fixing portion 30. Note that in FIG. 7, a later-described top plate 71 of the upper case portion 70 is not illustrated in order to make it easier to understand the arrangement state of the wire harness 20.

The wire harness 20 is wound around the seat-side fixing portion 44. The wire harness 20 may also be wound around the seat-side fixing portion 44 in intimate contact therewith, or may also be loosely wound around the seat-side fixing portion 44 at an interval.

The wire harness 20 is arranged in the case 40 in an orientation in which the surface of the base sheet 25 or the cover sheet 26 intersects with the bottom plate portion 42. The wire harness 20 is configured to be able to stand against the bottom plate portion 42 due to the reaction force of the plurality of wires 22 that are bent around the seat-side fixing portion 44.

When the case 40 reaches a frontward-facing state shown in FIG. 7, the wire harness 20 is arranged such that it is pulled out obliquely rightward and frontward from the seat-side fixing portion 44, thereafter folded over rearward, and thereafter loosely surrounds the seat-side fixing portion 44 once.

Figure 8:
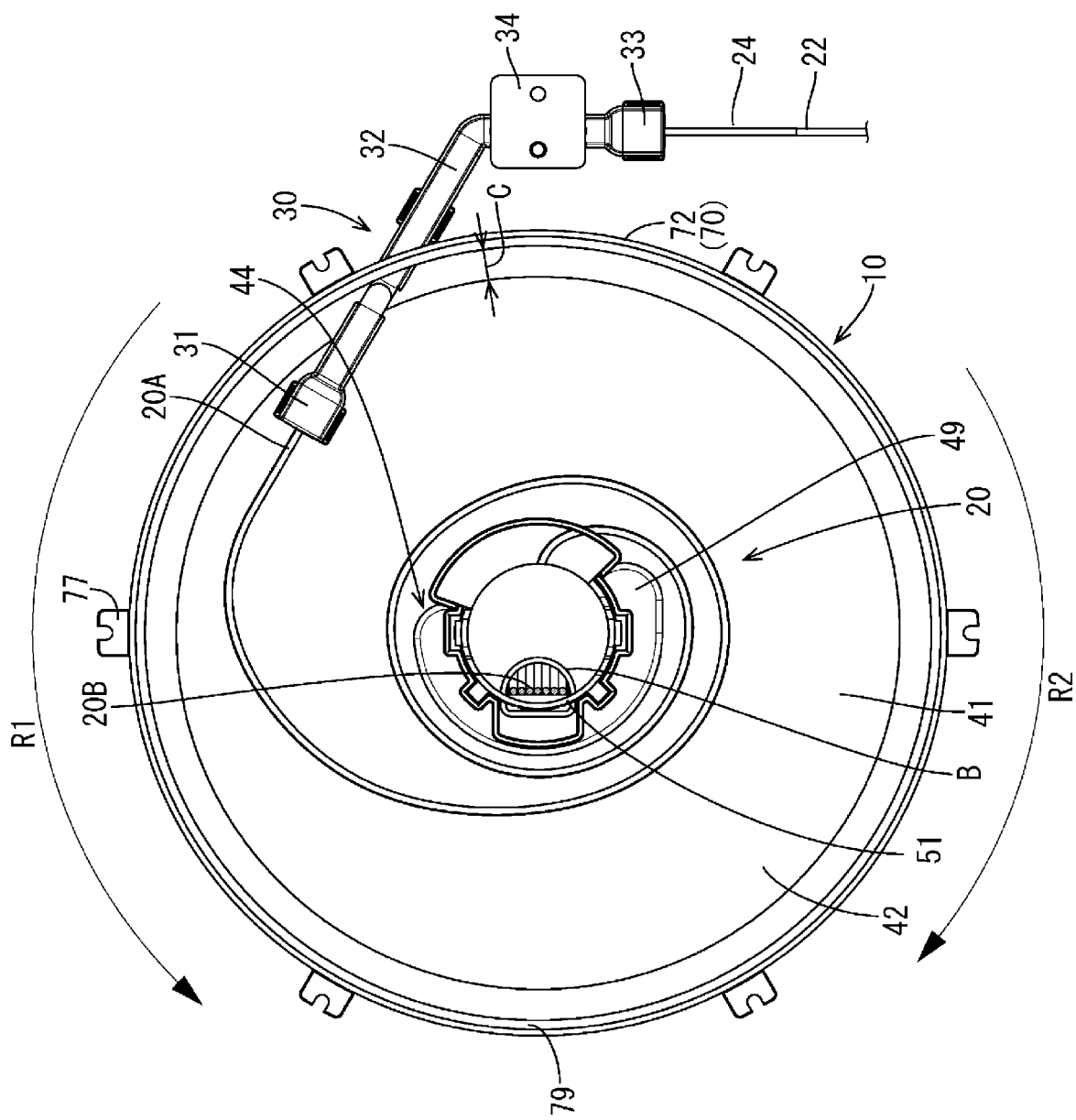
FIG. 8 is a plan view showing a state where the wire harness surrounds the seat-side fixing portion approximately twice.

Also, when the case 40 is rotated leftward R1, as shown in FIG. 8, the wire harness 20 is wrapped by the seat-side fixing portion 44. Then, the wire harness 20 is arranged such that it is pulled out rightward from the seat-side fixing portion 44, thereafter bent rearward, and thereafter surrounds the seat-side fixing portion 44 approximately twice in a state of contact with the protruding side wall 47 of the protruding portion 46 of the seat-side fixing portion 44.

On the other hand, upon rotating rightward R2, which is clockwise in FIG. 8, the wire harness 20 wrapped around the seat-side fixing portion 44 enters a state in which it is unwrapped from the seat-side fixing portion 44, and is arranged in a state in which it surrounds the seat-side fixing portion 44 approximately once as shown in FIG. 7.

Next, the upper case portion 70 will be described. As shown in FIG. 2, the upper case portion 70 includes a top plate 71 that has a circular flat plate shape, a circular side wall 72 that is provided on the top plate 71, and a lock wall portion 75 that is provided on the upper surface of the top plate 71.

The top plate 71 has an outer radius that is slightly larger than the outer radius of the bottom plate portion 42 of the lower case portion 41, and an insertion hole 74 that penetrates in the up-down direction, which is the plate thickness direction, is provided in the center of the top plate 71.

When the upper case portion 70 is attached to the lower case portion 41 from above, the upright wall 50 of the seat-side fixing portion 44 of the lower case portion 41 is inserted through the insertion hole 74 from below.

The lock wall portion 75 is provided on a portion of the opening edge of the insertion hole 74. The lock wall portion 75 has a circular arc shape, and when the upper case portion 70 is attached to the lower case portion 41, the lock wall portion 75 is arranged along the outer periphery of the upright wall 50. Also, the insertion hole 74 is expanded into a fan shape at the portion of the opening edge of the insertion hole 74 at which the lock wall portion 75 is not formed. Locked portions 76 are provided at positions on the inner circumferential surface of the lock wall portion 75 that correspond to the elastic pieces 53 of the upright wall 50, and when the upper case portion 70 is attached to the lower case portion 41, the upper case portion 70 is held in a state in which it is attached to the lower case portion 41 as a result of the locking protrusions 54 of the elastic pieces 53 and the locked portions 76 engaging with each other in the up-down direction.

A circular side wall 72 is formed continuously on the outer circumferential edge of the top plate 71. The circular side wall 72 has a form extending downward from the outer circumferential edge of the top plate 71, and multiple attachment pieces 77 are provided at equal intervals on the outer surface of the circular side wall 72.

As shown in FIG. 2, the height in the up-down direction of the circular side wall 72 is set to be slightly greater than the height of the protruding portion 46 of the lower case portion 41. When the lower case portion 41 and the upper case portion 70 are attached to each other, the circular side wall 72 covers the wire harness 20 arranged on the bottom plate portion 42 of the lower case portion 41 together with the top plate 71, and the accommodation portion 40A that accommodates the wire harness 20 is formed by the top plate 71, the circular side wall 72, and the bottom plate portion 42.

Also, a harness reception portion 79 that protrudes slightly inward in the radial direction from the lower end portion of the circular side wall 72 is provided on the lower end portion of the circular side wall 72.

When the lower case portion 41 and the upper case portion 70 are attached to each other, the harness reception portion 79 opposes the outer circumferential edge of the bottom plate portion 42 of the lower case portion 41 over the entire circumference thereof, and a gap C is formed between the harness reception portion 79 and the outer circumferential edge of the bottom plate portion 42 of the lower case portion 41. The gap dimension between the harness reception portion 79 and the outer circumferential edge of the bottom plate portion 42 is set to be slightly larger than the outer radius of the second tube-shaped portion 32B of the guide tube portion 32 of the base-side fixing member 30, and when the base-side fixing member 30 is fixed to the base portion 90 and the case 40 is fixed to the rotation platform 80, the second tube-shaped portion 32B is arranged in the gap C between the harness reception portion 79 and the outer circumferential edge of the bottom plate portion 42.

Also, as shown in FIG. 2, the harness reception portion 79 supports the wire harness 20 from below when the wire harness 20 is arranged on the inner circumferential surface of the circular side wall 72. That is, for example, when the wire harness 20 is arranged along the inner circumferential surface of the circular side wall 72 due to the reaction force of the wire harness 20 or the like, the wire harness 20 is supported from below by the harness reception portion 79, and therefore the protective member 24 of the wire harness 20 can prevent the case 40 from being pulled to the outer side from the gap C.

Effects of Embodiment

Next, effects of this embodiment will be described. In this embodiment, the wire harness routing apparatus 10 includes the case 40 and the wire harness 20 that is accommodated in the case 40. The seat-side fixing portion 44 is provided inside the case 40. The wire harness 20 is wound around the seat-side fixing portion 44, and the wire harness 20 includes at least one wire 22 and the protective member 24 that protects the wire 22. The protective member 24 includes the insertion path 27 through which the wire 22 is inserted, and the insertion path 27 is formed between the sheet-shaped base sheet 25 and the sheet-shaped cover sheet 26 that overlaps the base sheet 25. The protective member 24 includes the joining portions 28 where the base sheet 25 and the cover sheet 26 are joined together at both lateral edges of the insertion path 27.

The protective member 24 is formed as a result of the base sheet 25 and the cover sheet 26 overlapping each other, and thus can be thinner than a corrugated tube. As a result, it is possible to reduce the outer diameter of the wire harness 20 wound around the seat-side fixing portion 44, and thus to reduce the size of the case and the size of the wire harness routing apparatus.

Because the wires 22 are respectively inserted through the tubular insertion paths 27, the wires 22 can easily move inside the insertion paths 27 in a direction in which the insertion paths 27 extend. As a result, the wire harness 20 can be easily wound around the seat-side fixing portion 44, and thus it is possible to reduce the size of the case 40 and further reduce the size of the wire harness routing apparatus 10.

According to this embodiment, one wire 22 is inserted through one insertion path 27.

Because one wire 22 is inserted through one insertion path 27, the wire 22 can easily move inside the insertion path 27. As a result, the wire harness 20 can be bent easily, it is possible to reduce the outer diameter of the wire harness 20 wound around the seat-side fixing portion 44, and thus to further reduce the size of the wire harness routing apparatus 10.

According to this embodiment, both the base sheet 25 and the cover sheet 26 are nonwoven fabrics.

Because nonwoven fabric internally has a large number of holes, it is possible to reduce the weight of the wire harness 20, compared to a wire harness in which the base sheet 25 and the cover sheet 26 are constituted by solid (i.e. non-porous) members. This makes it possible to reduce the weight of the wire harness routing apparatus 10.

According to this embodiment, the protective member 24 includes the sewing thread 29 with which the base sheet 25 and the cover sheet 26 are sewn at the joining portions 28.

Because a sewing machine can be used when the base sheet 25 and the cover sheet 26 are joined together, it is possible to improve the efficiency of manufacturing the wire harness routing apparatus 10.

Embodiment 2

Figure 9:
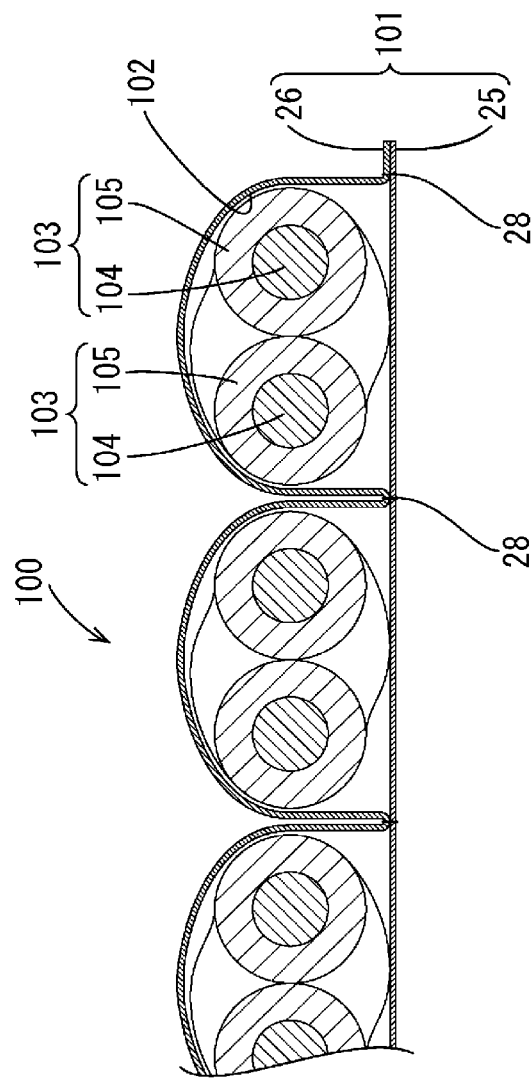
FIG. 9 is a cross-sectional view showing a wire harness according to Embodiment 2.

Next, Embodiment 2 of this disclosure will be described with reference to FIG. 9. In a wire harness 100 according to this embodiment, a protective member 101 is provided with a plurality of insertion paths 102. Two wires 103 are inserted through one insertion path 102. Two wires 103 may be a twisted pair cable in which wires are twisted together, or may be two independent wires 103. Each wire 103 includes a core wire 104 made of a conductive metal and an insulating sheath 105 covering the outer circumferential surface of the core wire 104. The insulating sheath 105 is made of an insulating synthetic resin.

Because configurations other than the above are substantially the same as that of Embodiment 1, the same members are given the same reference numerals, and their redundant description will be omitted.

If the two wires 103 constitutes a twisted pair cable, the two wires 103 can be arranged close to each other, and thus noise performance can be improved.

If the two wires 103 are independent wires 103, it is possible to increase the wiring density of the wires 103 in the wire harness 100.

Other Embodiments (1) Although the wire harness routing apparatus 10 is applied to a rotary seat in Embodiment 1, there is not limitation to this, and the wire harness routing apparatus 10 may also be applied to a sliding seat, or may also be applied to a wire harness routing apparatus of any device.

(2) Although one protective member is provided with seven insertion paths 27 in Embodiment 1, there is no limitation to this, and one protective member 24 may be provided with one to six, or seven or more insertion paths 27.

(3) Three or more wires 22 may also be inserted through one insertion path.

(4) In Embodiment 1, a configuration was used in which the wire harness 20 is wrapped clockwise. However, there is no limitation to this, and a configuration may also be used in which the wire harness 20 is wrapped counterclockwise.

(5) Although the protective member has a configuration in which the base sheet and the cover sheet that is separate from the base sheet overlap each other in this embodiment, there is no limitation to this, and a configuration may be adopted in which one sheet is folded back and stacked on each other, and one portion of the stacked sheet may be used as a base sheet and the other portion may be used as a cover sheet.

LIST OF REFERENCE NUMERALS

10 Wire harness routing apparatus
20, 100 Wire harness
20A Base-side end portion
20B Seat-side end portion
22, 103 Wire
24, 101 Protective member
25 Base sheet
26 Cover sheet
27, 102 Insertion path
28 Joining portion
29 Sewing thread
30 Base-side fixing member
31 Outer covering body holding portion
32 Guide tube portion
32A First tube-shaped portion
32B Second tube-shaped portion
32C Third tube-shaped portion
32D Fourth tube-shaped portion
33 Protective member holding portion
34 Fixing piece
34A Circular tube portion
40 Case
40A Accommodation portion
41 Lower case portion
42 Bottom plate portion
44 Seat-side fixing portion
46 Protruding portion
46A Through hole
47 Protruding side wall
48 Protruding upper wall
49 Overhang portion
50 Upright wall
51 High upright wall
52 Low upright wall 53 Elastic piece
54 Locking protrusion
55 Harness insertion port
70 Upper case portion
71 Top plate
72 Circular side wall
74 Insertion hole
75 Lock wall portion
76 Locked portion
77 Attachment piece
78 Screw recessed portion
79 Harness reception portion
80 Rotation platform
82 Base-side pedestal
84 Seat-side pedestal
90 Base portion
92 Base main body
94 Leg portion
104 Core wire
105 Insulating sheath

What is claimed is:

1. A wire harness routing apparatus comprising:
a case configured to rotate together with rotation of a seat that is rotatable with respect to a base portion provided in a vehicle; and
a wire harness that is accommodated in the case,
wherein the wire harness is routed between the base portion and the seat,
one end portion of the wire harness is a base-side end portion routed toward the base portion, and another end portion of the wire harness is a seat-side end portion,
an axial portion is provided inside the case, and the wire harness is wound around the axial portion,
in the axial portion, the seat-side end portion is fixed to a rotational center of the case, bent upward, and guided toward the seat side,
the wire harness includes at least one wire and a protective member that protects the wire,
the protective member includes an insertion path through which the wire is inserted,
the insertion path is formed between a sheet-shaped base sheet and a sheet-shaped cover sheet that overlaps the base sheet, and
the protective member has joining portions where the base sheet and the cover sheet are joined together at both lateral edges of the insertion path.

2. The wire harness routing apparatus according to claim 1, wherein one of the wires is inserted through one of the insertion paths.

3. The wire harness routing apparatus according to claim 1, wherein the base sheet and the cover sheet are woven fabrics or nonwoven fabrics.

4. The wire harness routing apparatus according to claim 1, wherein the protective member includes a sewing thread with which the base sheet and the cover sheet are sewn at the joining portions.

* * * * *